United States Patent [19]

Tate

[11] Patent Number: 4,659,619

[45] Date of Patent: Apr. 21, 1987

[54] COLOR CHANGEABLE FABRIC

[75] Inventor: Clarence R. Tate, Fairfield, Ill.

[73] Assignee: Thalatta, Inc., Fairfield, Ill.

[21] Appl. No.: 831,627

[22] Filed: Feb. 21, 1986

Related U.S. Application Data

[60] Continuation of Ser. No. 726,518, Apr. 24, 1985, abandoned, which is a division of Ser. No. 605,270, Apr. 30, 1984, Pat. No. 4,528,237, which is a division of Ser. No. 272,531, Jun. 11, 1981, Pat. No. 4,457,723.

[51] Int. Cl.[4] .......... B32B 5/16

[52] U.S. Cl. .......... 428/321.5; 346/21; 428/328; 428/372; 428/398; 428/900

[58] Field of Search .......... 428/321.5, 328, 372, 428/398, 900; 35/66; 340/324 M; 346/21

[56] References Cited

U.S. PATENT DOCUMENTS

| | | | |
|---|---|---|---|
| Re. 25,363 | 4/1963 | Tate | 35/66 |
| Re. 25,822 | 7/1965 | Tate | 35/66 |
| 503,373 | 8/1893 | Heinze | 428/167 X |
| 2,738,616 | 3/1956 | Windle | 46/1 |
| 3,013,206 | 12/1961 | Youngquist et al. | 324/38 |
| 3,036,388 | 5/1962 | Tate | 35/66 |
| 3,126,924 | 3/1964 | Kirkpatrick | 428/900 X |
| 3,206,657 | 9/1965 | Moriya | 335/303 |
| 3,221,315 | 11/1965 | Brown, Jr. et al. | 340/174.1 |
| 3,406,363 | 10/1968 | Tate | 335/302 |
| 3,460,248 | 8/1969 | Tate | 29/607 |
| 3,683,382 | 8/1972 | Ballinger | 346/74 M |
| 3,938,263 | 2/1976 | Tate | 35/66 |
| 4,009,382 | 2/1977 | Nath | 240/1 LP |
| 4,143,472 | 3/1979 | Murata et al. | 35/66 |
| 4,211,668 | 7/1980 | Tate | 252/316 |
| 4,232,084 | 11/1980 | Tate | 428/309 |
| 4,253,909 | 3/1981 | Lee | 156/654 |
| 4,368,952 | 1/1983 | Murata et al. | 350/362 |

FOREIGN PATENT DOCUMENTS

| | | | |
|---|---|---|---|
| 809827 | 4/1969 | Canada . | |
| 810324 | 4/1969 | Canada . | |
| 1102339 | 3/1961 | Fed. Rep. of Germany . | |
| 2433218 | 1/1976 | Fed. Rep. of Germany . | |
| 2494469 | 5/1982 | France . | |
| 842480 | 7/1960 | United Kingdom | 434/430 |
| 2065908 | 7/1981 | United Kingdom . | |

OTHER PUBLICATIONS

Lee, "A Magnetic Particles Display," *Information Display*, Spring 1977, pp. 12 and 13.

*Primary Examiner*—Marion C. McCamish
*Attorney, Agent, or Firm*—John F. Witherspoon

[57] ABSTRACT

A fabric formed from fiber-like strands of hollow, transparent filaments which have been woven or otherwise joined together is disclosed. The hollow strands contain a liquid in which color-coded micromagnets are dispersed. The micromagnets are free to rotate within the filament, the fabric thereby being capable of changing colors, either selectively or totally, when an activating magnetic force causes the micromagnets therein to rotate. The fabric may incorporate, in place of color-coded micromagnets, other orientable bodies which are also capable of being oriented, as for example by an electromagnetic or electrostatic force field, to produce a visual display. Further, the fabric may comprise a material having one or more liquid filled veins, the liquid again containing color-coded micromagnets or orientable bodies dispersed therein.

28 Claims, 8 Drawing Figures

COLOR CHANGEABLE FABRIC

This is a continuation of application Ser. No. 726,518, filed Apr. 24, 1985 now abandoned, which in turn is a division of application Ser. No. 605,270, filed Apr. 30, 1984, now U.S. Pat. No. 4,528,237, which in turn is a division of application Ser. No. 272,531, filed June 11, 1981, now U.S. Pat. No. 4,457,723.

BACKGROUND OF THE INVENTION

In my U.S. Pat. Nos. 3,036,388 (since reissued as Re. 25,363 and Re. 25,822), 3,406,363, 3,460,248 and 3,938,263 there are described multicolored micromagnets and rotatable multi-colored micromagnets suspended in a transparent liquid medium, including droplets thereof which may form a discontinuous phase of a continuous hardenable transparent film. My U.S. Pat. No. 4,211,668 discloses a process of making microcapsules having transparent capsule shells and containing a hydrophilic liquid in which rotatable color-coded micromagnets may be suspended. Further, my U.S. Pat. No. 4,232,084 discloses a hardened transparent sheet comprising a binder and hardened microcapsules, the microcapsules containing rotatable viewable color-coded micromagnets dispersed in a liquid. As discussed throughout these patents, the micromagnets have at least two contrasting colors and are magnetically responsive.

The disclosures of all of the above-mentioned patents are incorporated herein by reference.

SUMMARY OF THE INVENTION

I have now invented a new article of manufacture containing rotatable viewable color-coded micromagnets which is quite different both in design and in process of manufacture from that heretofore developed. Thus, the present invention represents an important and substantial breakthrough in the art by providing a product which at the same time possesses markedly superior properties, is easier to manufacture, and economizes on materials. Moreover, the product of this invention is believed to have essentially unlimited practical applications in a wide range of otherwise unrelated technologies and industries.

I have now invented a fabric which will change colors when acted upon by a magnetic field. The fabric may be conveniently handled and cut and used wherever a change of colors or designs may be desired from time to time. On a wall in lieu of wallpaper, for example, the fabric provides for an easy change of colors and patterns anytime without redecorating cost to the owner. On the wall in a child's room, the fabric provides a unique area across which magnetic writing and drawing requires no clean up and causes no damage whatsoever.

When supported by a substrate or backing member, the fabric may also be used as a writing board, the writing being performed with a magnetized stylus and erasing being instantly accomplished with a magnetized eraser.

The fabric may also be incorporated to perform with electronically addressed and actuated magnetic circuits (e.g. electromagnets). Since the micromagnets in the fabric can form letters, numbers, drawings, pictures, etc. in the fabric, and retain their orientation after the actuating magnetic field is removed, the electronic drive circuit can be simplified and reduced by the common electronic design method of multiplexing.

These are but a few of the myriads of practical applications in which the fabric of this invention can be employed.

The fabric may be formed from fiber-like strands of hollow, transparent filament which are liquid filled and contain rotatable, magnetically responsive material, the strands being joined together, as for example by weaving, etc. The fabric may incorporate, in place of color-coded micromagnets, other orientable bodies which are capable of being selectively oriented, as for example by an electromagnetic or electrostatic force field, to produce a visual display. In so doing, these bodies in some instances may act in cooperation with their background. Further, the fabric may comprise a material having a plurality of liquid filled veins, the liquid again containing color-coded micromagnets or other orientable bodies dispersed therein.

My invention also includes the hollow, transparent, liquid filled, micromagnet or other orientable body containing filament from which the fabric is made.

DETAILED DESCRIPTION OF THE DRAWINGS

Figure 1:
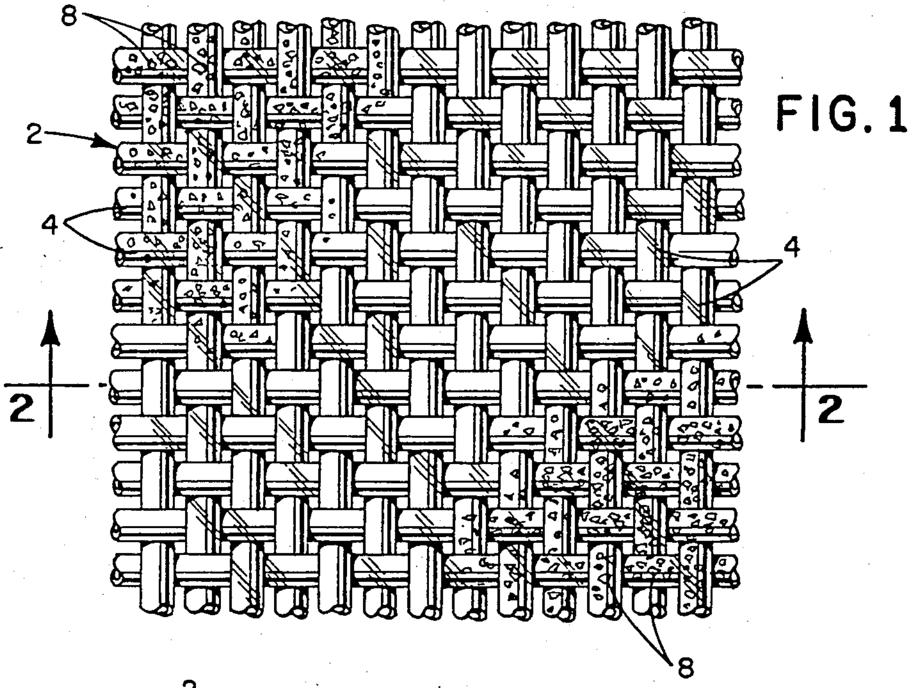
FIG. 1 is a plan view of a fabric composed of hollow filaments woven together.
Figure 2:
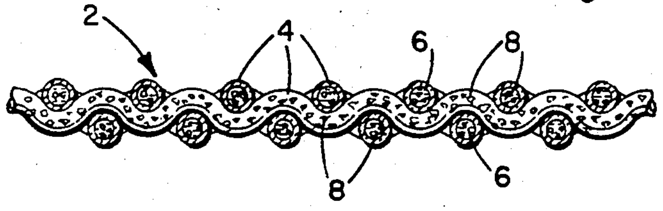
FIG. 2 is a cross sectional view taken on line 2—2 of FIG. 1.

FIGS. 1 and 2 show, greatly enlarged, a fabric of this invention. The fabric 2 comprises hollow filament strands 4 containing liquid 6 in which are present micromagnets 8. The filament strands are shown in a flexible fabric having a plain weave although the type of weave may be chosen from a wide range, including twill or satin, or from various and special derived weaves.

Figure 3:
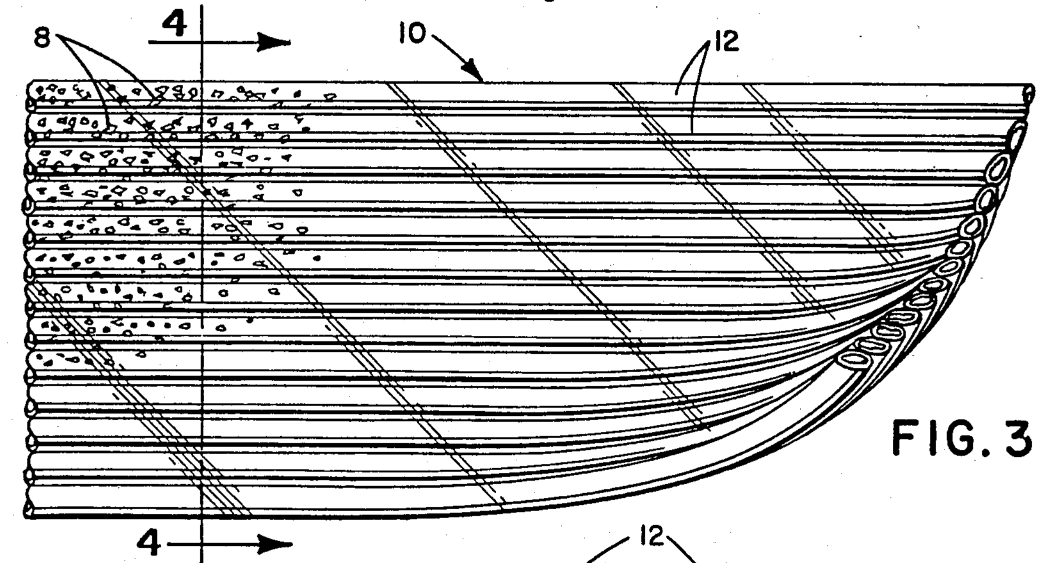
FIG. 3 is a plan view of a fabric composed of parallel filaments bound together.
Figure 4:
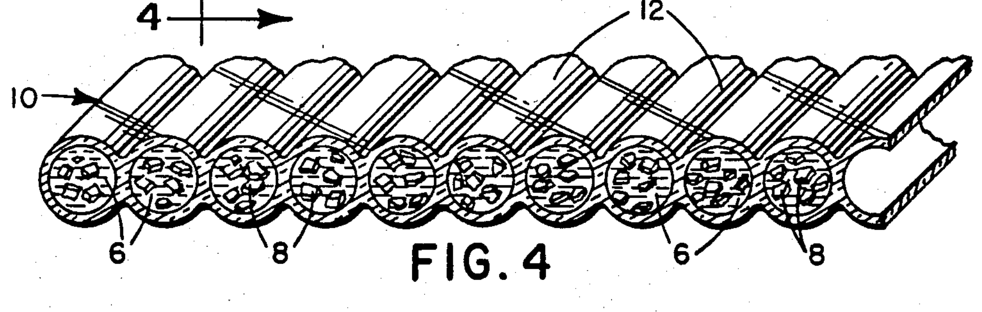
FIG. 4 is a perspective view taken on line 4—4 of FIG. 3.

FIGS. 3 and 4 show, greatly enlarged, another fabric 10 of this invention which comprises hollow filament strands 12 containing liquid 6 in which are present micromagnets 8. In this fabric the filament strands have been joined to form a flexible fibrous material having contiguous strands running together concurrently.

Figure 5:
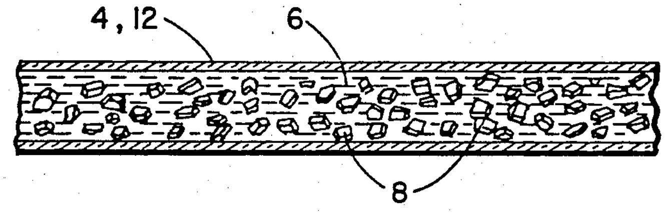
FIG. 5 is a longitudinal sectional view of a transparent filament containing micromagnets dispersed in a liquid.

FIG. 5 shows, greatly enlarged, a transparent hollow filament strand 4, 12 containing liquid 6 in which are dispersed micromagnets 8.

Figure 6:
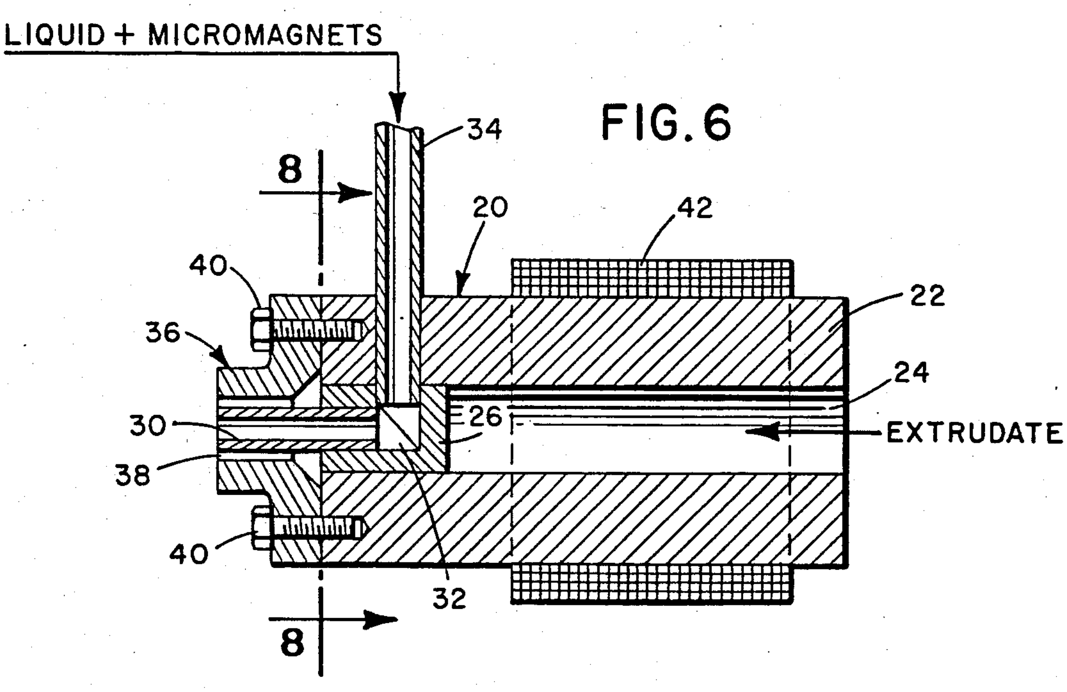
FIG. 6 is a longitudinal sectional view of an extrusion die suitable for forming the filament of this invention.
Figure 7:
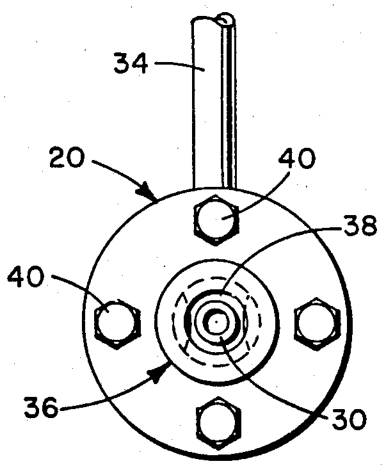
FIG. 7 is an end elevational view of the die of FIG. 6.
Figure 8:
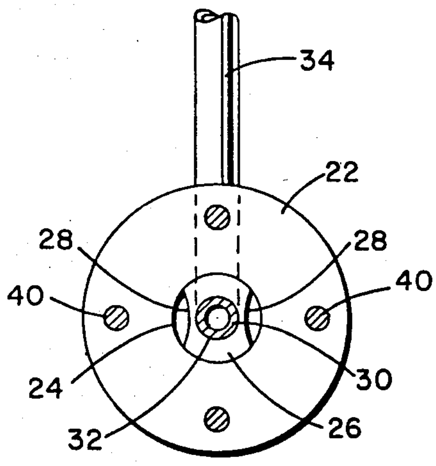
FIG. 8 is a cross sectional view taken on line 8—8 of FIG. 6.

FIGS. 6, 7 and 8 do not represent my invention, but illustrate the type of die which has functioned quite satisfactorily in reducing my invention to practice. It will be apparent to persons skilled in the art having the benefit of this disclosure that other dies similar to the above also can be used.

Referring to FIGS. 6, 7 and 8, die 20 comprises a tubular barrel 22 having a central bore 24 for the passage of extrudate. A spider 26, having serrations 28 (see FIG. 8) is secured in the bore 24 opposite the entrance of the extrudate. A tubular mandrel 30 is secured axially in a hole 32 drilled in spider 26, said mandrel communicating with another tube 34 inserted perpendicular to tube 32 through a hole in barrel 22 and spider 26. The free end of mandrel 30 is surrounded by a nozzle 36 which is secured to barrel 22 by screws 40. An annular space 38 is formed between mandrel 30 and nozzle 36.

In operation a liquid containing micromagnets is introduced into tube 34 and is passed out through tubular mandrel 30. Simultaneously, an extrudate passes through bore 24 and serrations 28 to surround the mandrel 30, a hollow filament thereby being formed in annular space 38. As the filament leaves nozzle 36, it is filled by liquid containing micromagnets flowing out of tubular mandrel 30.

The extrudate is maintained in suitable flowable condition by heating element 42 surrounding barrel 22.

In a die which has been used satisfactorily, mandrel 30 had an O.D. of 0.059 and an I.D. of 0.041 and nozzle 36 had an I.D. of 0.070, giving a clearance around mandrel 30 of 0.0055 (all dimensions in inches).

DETAILED DESCRIPTION OF THE INVENTION

In the instant invention a fabric is made from hollow filaments containing a liquid in which viewable color coded micromagnets, or other rotatable, magnetically responsive material, are present and free to turn. The color of this novel fabric can be changed at will. In a woven fabric, made for example by putting the filaments on a loom, the filament strands may be used for both the warp and the weft. Fabric may also be made by employing the filament strands as the warp on the loom and a fine transparent plastic thread as the weft, and vice versa.

Used to produce still another texture, the filament strands, positioned contiguously in a side-by-side relationship, can be adhered each to the next to produce a fibrous fabric having longitudinal strands running concurrently. If desired, one length of this fabric may be laid across another, and bonded together to produce an exceptionally strong laminated material.

The fabric may be adhered to a backing or substrate and, if the backing is opaque, viewing is done from the filament side. If the backing is transparent, viewing may be done from that side. To improve optical characteristics, the fabric may be coated with a dark color on the side opposite the viewer.

A convenient way to make the contiguous filament fabric material is to spirally coil a filament layer around a revolving drum, after which the coil may be bonded together in any of several ways. One such manner is to apply a transparent binder adhesive across the filament coil and, after the adhesive has dried or hardened, the resultant fabric is slit across the drum and opened off. The drum surface, of course, must be of a material, or must have a covering of a material, to which the adhesive does not adhere. A release paper, for example, first used to cover a drum, serves this purpose well.

Another convenient way of joining the filaments together is to spirally coil the filament strand around the drum as it comes from the extruder die, still carrying a temperature sufficiently elevated to cause it to fuse to its neighbor spiral. The filament, under this condition, is self-adhering and the resultant fabric is taken off the drum with no need whatever for adhesive bonding between the filament strands.

If a backing is desired, the fabric taken off the drum may be adhered to such material as paper, cloth, plastic or metal. Alternatively, a backing such as paper or cloth may be adhered to the filament coil while still on the drum with the fabric and backing then taken, as one, off the drum.

The filament is made by forming a transparent, hollow, fiber-like strand while simultaneously filling it with a transparent liquid, the liquid carrying rotatable magnetically responsive material. From an extruder die of the type illustrated in FIG. 6, transparent material, molten, is drawn onto a take up reel with the liquid being fed through the tubular mandrel and filling the hollow filament as it exits from the die. The filament material is chosen to have a good draw-down potential to afford a tiny fiber-like hollow, liquid filled, filament wound onto a take up reel.

The following non-limiting examples further illustrate the invention.

EXAMPLE 1

In a $\frac{3}{4}$"25:1 extruder, an ionomer resin (Surlyn #1555, Dupont) was used with the first heater zone at 275° F., the second zone at 475° F., and the die heater at 350° F. The micromagnet containing liquid was forced through the tubular mandrel from a closed container under air pressure of about 2 psi. The liquid used was a polybutene (Indopol L-14, Amoco) to which a thixotropic feature had been imparted with a small quantity of Bentone #38 (N.L. Industries, Inc.) dispersed under vigorous shear. Dispersed in 150 grams of the liquid then were 30 grams of color-coded micromagnets, platelet shaped, having a broad dimension of about 5 mils, the mixture being stirred under reduced pressure to remove bubbles. The micromagnets had been made principally of color pigments, barium ferrite, and a polyvinyl chloride binder. With the extruder screw turning at a speed of 16 rpm a take off reel several feet away, to give time for cooling, drew off a 15 mil O.D. filament at the rate of about 400 feet per minute. (Optionally, downstream equipment may be used, here, which incorporate various conventional provisions for chill cooling.)

The filament, now on the take up reel, was ready for use and, on a loom, this filament was capable of producing several different textured fabrics, with each desired pattern being easily selected by using well-known weaving techniques.

EXAMPLE 2

On another run, the same as above, the completed filament was rewound, spirally, arranging itself in a single layer onto a large drum, the surface of which had been covered with a release paper. The filament coil was then coated with a copolymer of vinyl acetate and a long chain acrylate (Gelva TS-100, Monsanto) and, after the binder had dried and hardened, the resultant fabric was slit and opened off the drum.

Various other adhesive binders may be used for this purpose, including but not limited to polyvinyl butyral (Butvar B-79, Monsanto) dissolved in acetone. Several different rubber cements have been used.

EXAMPLE 3

In this run a take off drum was used and was positioned about 18" from the extruder die. The extrupositioned date resin used was an ionomer resin (Surlyn

#1702, Dupont). The first heat zone was set at 200° F., the second zone at 475° F. and the die heater at 325° F. The liquid used was a white mineral oil (Tufflo 6014, Atlantic Richfield) into which had been dispersed Bentone #38 under high shear. Twelve grams of color-coded micromagnets having an average broad dimension of about 6 mils were then dispersed in 150 grams of the liquid. The micromagnets had been made principally of color pigments, barium ferrite, and an acrylic-nitrocellulose binder. With the extruder screw turning at 20 rpm, the speed of the revolving drum was adjusted to draw off filament having an O.D. of about 20 mils, the filament going onto the drum while still carrying sufficient heat to cause each spiral to adhere to its neighbor upon touching. When a single layer coil was wound across the drum, the resultant fabric was slit and opened off, the filaments being already bonded to each other with no need whatever for a bonding adhesive.

EXAMPLE 4

The extrudate resin used in this example was an ethylene-vinylacetate copolymer (Ultrathene 636, U.S. Industrial Chemicals Co.) and the liquid was a combination of, by weight, 4/5 propylene glycol and 1/5 glycerine. A side mix of 10 grams of Bentone LT in 400 grams of water was prepared and 10 grams of this mix was stirred into 140 grams of the propylene glycolglycerine. Into this liquid was then dispersed 10 grams of the micromagnets described in Example 3 and, with the first heat zone off, the second zone at 350° F., and the die heater at 300° F., a filament having an O.D. of about 14 mils and an I.D. of about 13 mils was drawn onto a take up reel. The screw speed for this size was set at 22 rpm and the pressure forcing the liquid through the mandrel was 5 psi.

In a subsequent run, a take up drum was positioned about 24 inches from the extruder die and each spiral of filament taken onto it adhered to the preceding spiral upon touching. The resultant fabric was then slit and opened off the drum.

The revolving drum used for this purpose was designed to also advance laterally as the oncoming filament continued to form around it a layer of touching spirals.

It will be appreciated that slitting the layer coil wound across the drum may be readily accomplished with any of a wide variety of cutting tools such as a guillotine blade, a simple cutting blade, a hot knife cutter, etc. A heated cutting blade has the advantage of opening the material off the drum and simultaneously sealing the ends of the filament.

If desired, the cut ends of the filament strands may be sealed with any suitable adhesive or they may be closed by heat sealing. In routine usage, though, depending on such factors as the viscosity and/or thixotropy of the liquid, the minuteness of the filament I.D., and the capillary action between the filament and the liquid, the ends of the filament may not have to be sealed at all.

The size of the filament taken onto the take up equipment can be selected by adjusting the speed of the take up reel, the heat of the extrudate, the rate of extrudate exiting from the die, the ratio of the liquid to the extrudate, or combinations of these and other factors such as the flow characteristics of the extrudate material itself. The size of the filament desired will of course take into account, among other considerations, the size of the magnetically orientable bodies to be carried within it.

For example, micromagnets having a broad dimension of 1 mil can be accommodated within a filament having an I.D. of about 2 mils. Thus, a filament having an O.D. of 3 mils and an I.D. of 2 mils functions well with magnetically responsive bodies of 1 mil in size. Smaller bodies, of course, can be accommodated by still smaller filaments. Filaments of about 10 mils O.D. and 9 mils I.D. have been found quite satisfactory. Filaments as large as 30 mils or more, while perhaps less desirable when viewed from a relative short reading distance, are optically suitable when viewed from a greater distance, as may be the case with a large display.

The curvature of the filament has been found to provide a lens-like effect over the micromagnets within, thereby tending to brighten and enhance their colors, and this feature may also be taken into consideration when deciding on the size of the filament to be used for a particular fabric.

In cross section, the filament may be circular or it may have other profiles such as oval, square, triangular, polygonal, etc., the cross sectional profile being determined by the design of the die.

The pressure used to control the flow of the liquid containing the magnetically responsive rotatable bodies is adjusted depending on the desired rate of emergence of the extrudate and may be provided by any of various means, such as air pressure, by a metering pump, or by gravity.

Various ratios of liquid to micromagnets have been used, ranging on a weight basis from as low as about 3:1 to as high as about 10:1, with a ratio of 5-6:1 being commonly employed. (Weight was used simply for convenience of measurement.) The desired ratio in a given situation may be outside this range, however, and may depend on such factors as micromagnet size and shape, the relative densities of micromagnet and liquid, viscosity of the liquid, etc.

In preparing the mixture of micromagnets and liquid air bubbles may be formed, especially if vigorous stirring is employed, but undesirable air bubbles may be removed by stirring under reduced pressure.

The die described above provides a filament strand containing a single vein of liquid. However, a die provided with two or more liquid outlet orifices positioned within a slot type nozzle can produce, simultaneously, a plurality of side-by-side, minute, liquid-filled veins or channels within the emerging extrudate. Thus, for example, from a die having two adjacent orifices, the extrudate emerges carrying dual liquid-filled veins within it.

Therefore, the fabric of this invention includes a material which has emerged directly from a die and which carries within it a plurality of veins filled with liquid, the liquid containing rotatable magnetically responsive material. This ribbon-like material may be employed as such, depending on the use intended, or it may be joined to other such material, or to filament strands, to form a layer fabric.

Any transparent material may be employed as an extrudate so long as it is capable of being formed having a liquid-filled vein. These materials include but are not limited to, polymers such as polyethylene, polypropylene, ethylene-vinylacetate copolymers, polyvinyl chloride and nylon. Ethylene-vinylacetate copolymer (Ultrathene UE 656, U.S. Industrial Chem. Co.) and polyvinyl chloride (Geon 8883, B. F. Goodrich) are two such materials which have been found useful. As is known in the extrusion art, temperature settings are made according to the melt characteristics of the polymer. For example, when the above polyvinyl chloride was employed, the first heat zone was at 250° F., the second zone at 375° F., and the die heater at 325° F.

The extrudate will to some extent be selected with the chosen liquid in mind. For example, some liquids may tend to blend with some extrudates at their melt temperature and thus injure the filament quality. Some mineral oils, for example, may tend to blend with some polyolefins, although useful filaments have been made employing a mineral oil as the liquid and a polyolefin as the extrudate. The choice of combinations is therefore best arrived at by simple preliminary tests.

Liquids selected to carry the magnetically responsive material may be hydrophobic such as, for example, mineral, vegetable or animal oils, or combinations thereof, or they may be hydrophilic such as, for example, glycerine, polyethylene glycol, propylene glycol, water, or combinations thereof. Hydrophobic liquids used in addition to those described in the foregoing Examples have been Klearol (Witco) and white mineral oil 18 USP (Amoco). Vegetable oils used have included sunflower oil, corn oil, peanut oil and safflower oil. Animal oils have included cod liver oil and neat's-foot oil. Blends of liquids in the form of an emulsion may also be used, giving a still further adjustment for such considerations as bodying and cost factors. The liquids are usually given a thixotropic quality, this feature being fully described in the above-mentioned patents.

Thixotropy has been provided in the hydrophilic liquids with Bentone LT, xanthan gum, propylene glycol alginate, or hydroxyethylcellulose, each first dispersed in a side mix with water. Thixotropy has been provided in both hydrophobic and hydrophilic liquids with a fumed silica (cab-o-sil). When the extrudate being used requires a relatively high die temperature, the ratio of water in the mix should be kept to a minimum because of the relatively low boiling point of water. In a die sufficiently cool, however, and with an extrudate requiring a relatively low melt temperature, water in any ratio may be used, or may be used alone.

Adhesives employed to bond the strands of filament together should be transparent. They may be of the type which hardens by solvent evaporation or by catalytic action. Hot melt materials which harden on cooling may also be used. Adhesives for bonding the fabric to a backing may be selected to become a permanent bond or, for example in the case of use such as a wall covering, it may be desirable to coat the fabric with a pressure sensitive adhesive in order that the fabric may be easily applied and peeled off.

As will be apparent, the present invention includes fabrics having a wide range of filament arrangements and resulting textures. The above description of a composite wherein a number of filament strands have been woven together, or arranged to run together concurrently, are illustrative only. The invention may be further illustrated, for example, by taking one long filament strand and looping it back and forth in such a way, or coiling it in such a way, that it appears in effect as multiple strands which are then bound or tied together.

The invention is not limited to the use of color-coded micromagnets. Other orientable bodies which are capable of being selectively oriented to produce a visual display may be used. Thus, for example, when magnetically responsive particles such as those described in U.S. Pat. No. 3,221,315 to Brown et al are employed in place of color-coded micromagnets, the magnetic particles, acting in cooperation with their background, will present a change of colors when caused to rotate by a magnetic field. Or, for other examples, magnetically responsive ferromagnetic crystals such as those described in U.S. Pat. No. 3,013,206 to Youngquist et al may be used in the fabric, as may highly reflective flakes such as those described in U.S. Pat. No. 3,683,382 to Ballinger, which flakes are actuatable by magnetic or electrostatic force fields.

While the equipment described herein was of laboratory size, it will be apparent to those skilled in the art that scaling up for mass production can be readily achieved through the use of larger equipment and the application of well-known principles of plant design. Thus, in Example 1 the extruder ran at about 16 rpm but had the capability of about 5 times that output. Hence, it could have produced a 15 mil filament at the rate of about 2000 ft. per min. The take off reel mentioned in Example 1 had a diameter of 3 inches and a length of 6 inches. The take off drums included one with a diameter of 8 inches and a length of 12 inches. Another drum had a 16 inch diameter and a 16 inch length. Drums in greater diameter and length are, of course, easily feasible within readily available conventional fixturing.

As previously mentioned, the present invention offers many advantages over prior work in this field. Among these are ease of manufacture. Since encapsulation of a liquid containing magnetically responsive material is no longer dependent on the expensive evaporation of solvents, or time-requiring curing, large quantities of this product now can be made much more simply and economically. The necessity of first making microcapsules or spherical shells for the magnetically responsive material liquid and then placing the same in a continuous phase matrix has been eliminated, and with it the need for large quantities of binder material, the expense and time of process steps such as mixing, drying, etc., and the potential environmental hazards from the evaporation of solvents. Further, the product of this invention is flexible, relatively light in weight, easily rolled or folded for warehouse storage, and is adaptable to a very wide range of applications. Moreover, this product, greatly simplified in construction, not only has improved structural strength but also has improved optical qualitites, since incident light entering the fabric and being reflected back from the material within, encounters a minimum of resistance in this new simplified construction of materials.

The foregoing description of my invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is my intention in the following claims to cover all such equivalent modifications and variations as fall within the true scope and spirit of my invention.

What is claimed is:

1. A hollow transparent filament containing a transparent liquid having rotatable color-coded micromagnets dispersed therein.

2. A hollow transparent filament containing a transparent liquid having rotatable bodies dispersed therein, which bodies are capable of being selectively oriented to produce a visual display.

3. A hollow filament as defined in claim 2 wherein said rotatable bodies are magnetically responsive particles.

4. A hollow filament as defined in claim 2 wherein said rotatable bodies are electrostatically responsive particles.

5. An article of manufacture as defined in claim 2 wherein said liquid contains a thixotropic agent.

6. An article of manufacture comprising a transparent material containing at least one vein of transparent liquid, said liquid containing rotatable color-coded micromagnets dispersed therein.

7. An article of manufacture as defined in claim 6 wherein said transparent material is an extruded polymeric material.

8. A product comprising a substrate and an article of manufacture as defined in claim 7.

9. A method of displaying an image which comprises imagewise selectively rotating the color-coded micromagnets in an article of manufacture as defined in claim 6.

10. A method as defined in claim 9 wherein said micromagnets are rotated by the magnetic field of an electric current.

11. A product comprising a substrate and an article of manufacture as defined in claim 6.

12. An article of manufacture as defined in claim 6 wherein said liquid contains a thixotropic agent.

13. An article of manufacture as defined in claim 6 wherein said liquid comprises an oil.

14. An article of manufacture as defined in claim 6 wherein said liquid comprises a hydrophilic liquid.

15. A method of producing an article of manufacture as defined in claim 10 which comprises extruding said transparent material through a die having at least two outlet orifices positioned therein and passing said transparent liquid through said orifices simultaneously with said extrusion.

16. An article of manufacture comprising a transparent material containing at least one vein of transparent liquid, said liquid containing rotatable bodies dispersed therein, which bodies are capable of being selectively oriented to produce a visual display.

17. An article of manufacture as defined in claim 16 wherein said transparent material is an extruded polymeric material.

18. A product comprising a substrate and an article of manufacture as defined in claim 17.

19. A method of displaying an image which comprises imagewise selectively rotating the rotatable bodies in an article of manufacture as defined in claim 16.

20. A method as defined in claim 19 wherein said bodies are rotated by the magnetic field of an electric current.

21. A product comprising a substrate and an article of manufacutre as defined in claim 16.

22. An article of manufacture as defined in claim 16 wherein said rotatable bodies are magnetically responsive particles.

23. An article of manufacture as defined in claim 16 wherein said rotatable bodies are electrostatically responsive particles.

24. A method of producing an article of manufacture as defined in claim 16 which comprises extruding said transparent material through a die having at least two outlet orifices positioned therein and passing said transparent liquid through said orifices simultaneously with said extrusion.

25. A method of displaying an image which comprises imagewise selectively rotating the color-coded micromagnets in a fabric comprising hollow transparent filaments bound together, said filaments containing a transparent liquid having rotatable color-coded micromagnets dispersed therein.

26. A method as defined in claim 25 wherein said micromagnets are rotated by the magnetic field of an electric current.

27. A method of displaying an image which comprises imagewise selectively rotating the rotatable bodies in a fabric comprising hollow transparent filaments bound together, said filaments containing a transparent liquid having rotatable bodies dispersed therein, which bodies are capable of being selectively oriented to produce a visual display.

28. A method as defined in claim 27 wherein said bodies are rotated by the magnetic field of an electric current.

* * * * *

UNITED STATES PATENT AND TRADEMARK OFFICE
CERTIFICATE OF CORRECTION

PATENT NO. : 4,659,619
DATED : April 21, 1987
INVENTOR(S) : Clarence R. Tate

It is certified that error appears in the above-identified patent and that said Letters Patent is hereby corrected as shown below:

Column 9, line 9, change "2" to -- 16 --

Signed and Sealed this

Thirteenth Day of October, 1987

*Attest:*

DONALD J. QUIGG

*Attesting Officer*

*Commissioner of Patents and Trademarks*